(12) United States Patent
Nakatani (10) Patent No.: US 6,487,632 B1
(45) Date of Patent: Nov. 26, 2002

(54) EMULATION TECHNIQUE FOR VARIABLE-LENGTH DISK SYSTEM TO ACCESS DATA IN A FIXED-LENGTH DISK SYSTEM

(75) Inventor: Yoji Nakatani, Yamato (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/313,781

(22) Filed: May 17, 1999

(30) Foreign Application Priority Data

May 18, 1998 (JP) .......................... 10-153605

(51) Int. Cl.[7] .............................. G06F 12/00
(52) U.S. Cl. ................. 711/112; 711/113; 711/114
(58) Field of Search .................. 711/111, 112, 113, 711/114

(56) References Cited

U.S. PATENT DOCUMENTS

| | | | | |
|---|---|---|---|---|
| 5,072,378 A | * | 12/1991 | Manka .......................... | 714/6 |
| 5,313,617 A | * | 5/1994 | Nakano et al. ................ | 703/24 |
| 5,568,628 A | * | 10/1996 | Satoh et al. ................. | 711/113 |
| 5,835,939 A | * | 11/1998 | Kurokawa et al. .......... | 711/112 |

FOREIGN PATENT DOCUMENTS

| | | |
|---|---|---|
| JP | 4-289561 | 10/1992 |
| JP | 61-150557 | 5/1994 |
| JP | 10-3359 | 1/1998 |

* cited by examiner

Primary Examiner—Matthew Kim
Assistant Examiner—Christian P. Chace
(74) Attorney, Agent, or Firm—Mattingly, Stanger & Malur, P.C.

(57) ABSTRACT

A disk system which, when a variable-length disk is emulated using a fixed-length disk, makes it unnecessary to perform extra disk accesses at the time of performing a reading/writing operation the fixed-length disk. The disk system includes an upper system that accesses data with the use of a variable-length formatted form, a disk control unit emulating the variable-length disk and performing control of the fixed-length disk, and a fixed-length formatted disk unit. A storing region in the disk unit is separated into two regions. Count areas in all CKD records are stored into one of the regions, and key areas and data areas in all the CKD records are stored into the other region. The count areas in all the CKD records, which have been stored in the one of the storing regions, are stored into a cache memory in the disk control unit. When an access is executed from the upper system to the disk unit, the count areas stored in the cache memory are referred to so as to search an object record. This allows an access to the disk unit to be executed only to the objective record thus searched.

9 Claims, 5 Drawing Sheets

FORMAT WITHIN DISK UNIT

FIG. 1
SYSTEM CONFIGURATION IN PRESENT INVENTION

FIG. 3
CACHE STRUCTURE

FIG. 2
FORMAT WITHIN DISK UNIT

FIG. 4 CACHE TABLE STRUCTURE

FIG. 5

COUNT AREA INFORMATION FORMAT

FIG. 6 PRIOR ART

CKD DISK FORMAT

FIG. 7 PRIOR ART

CKD RECORD FORMAT

FIG. 8

EMULATION TECHNIQUE FOR VARIABLE-LENGTH DISK SYSTEM TO ACCESS DATA IN A FIXED-LENGTH DISK SYSTEM

BACKGROUND OF THE INVENTION

The present invention relates to a method and system for controlling a disk control unit in a variable-length formatted disk system. More particularly, the present invention relates to an emulation technique that effectively allows an upper system employing a variable-length disk to perform high-speed access to an objective data using a fixed-length disk unit and the disk control unit including a cache.

In a conventional technique, when the variable-length disk is emulated using the fixed-length disk unit, a plurality of blocks in the fixed-length disk are assigned to a capacity equivalent to one track in the variable-length disk. Then, within the plurality of blocks thus assigned and for each record in the variable-length disk, a format information area and a data area are located and stored in accordance with a certain rule.

When performing an access to a record in such a system, data in the entire tracks to be accessed, first of all, had to be read into a buffer or the cache existing within the disk control unit. Then, after analyzing formats therein and determining a position of the object record, the access has to be executed.

SUMMARY OF THE INVENTION

In such a conventional technique, even when a single record within a track is read out, the data in the entire tracks have to be read out once, and then, after the data are analyzed within the disk control unit, the object record has to be transmitted up to the upper system.

Also, when executing a writing toward the disk, in order to determine a writing position before the writing process, the data in the entire tracks need to be read out, and after that, the writing is executed into the disk. Namely, it turns out that, in the one input/output process, the two accesses have to be performed to the disk unit.

In this way, when executing the emulation of the variable-length disk, the loads onto the disk operation are increased. This has become a problem on the performance thereof.

It is an object of the present invention to make it unnecessary to perform, when the variable-length disk is emulated using the fixed-length disk unit, the extra disk accesses at the time of reading/writing to the fixed-length disk unit.

In order to accomplish the above object, according to an aspect of the present invention, there is provided a disk system including a disk control unit connected to an upper system and emulating a variable-length formatted disk with the use of a fixed-length formatted disk, the upper system using the variable-length formatted disk that employs as its access unit a variable-length record including a format information area and a data area, the fixed-length formatted disk employing a constant-sized block as its access unit, and a fixed-length formatted disk unit controlled by the disk control unit, wherein said disk unit includes a format information area storing a region in which the format information areas are stored, and the disk control unit has means, for separating the format information areas which exist in the variable-length formatted records, from all the records and storing all the separated format information areas into the format information area storing region in the disk unit.

Also, the disk control unit includes a cache memory, means for storing the format information areas, which are stored in the format information area storing region in the disk unit, into the cache memory at the time of a reset processing of the disk system, and means for referring to the format information areas in the cache memory so as to search an object record when an access is executed from the upper system to the disk unit, thereby allowing an access to the disk unit to be executed only to the target record thus searched.

Also, the format information area has an identifier establishing a search condition for a record, block number indicating a storage position within the disk unit, and data length information indicating size of the data area.

DETAILED DESCRIPTION OF THE EMBODIMENTS

Referring to the accompanying drawings, the detailed description will be given below concerning an embodiment of the present invention.

Figure 1:
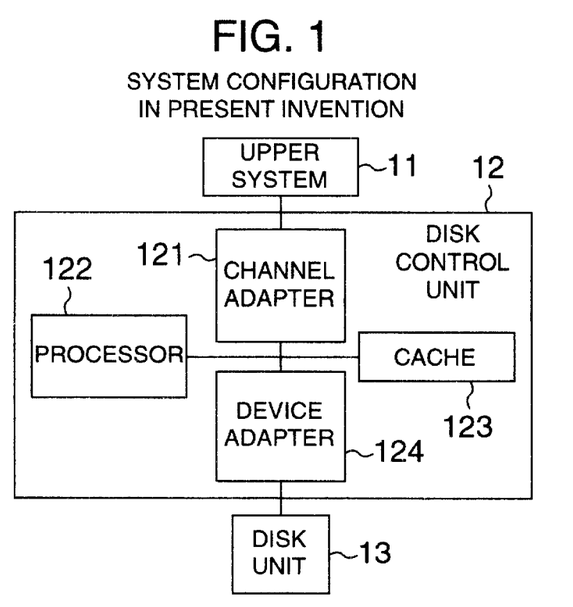
FIG. 1 is a block configuration diagram of a disk control system that illustrates an embodiment of the present invention.

FIG. 1 illustrates in a block diagram the configuration of a disk system according to the embodiment of the present invention.

The disk system in the present embodiment includes an upper system 11 accessing data in a disk unit with the use of a CKD format, i.e. a variable-length formatted form, a disk control unit 12 performing a disk control toward the variable-length format, and the disk unit 13, i.e. a fixed-length formatted disk controlled by SCSI.

Also, the disk control unit 12 includes CHA 121, i.e. a channel adapter performing data communications with the upper system 11, MPU 122, i.e. a processor executing various types of processings in accordance with requests from the upper system 11 and performing format transformation between the fixed-length format and the CKD format, a cache 123, i.e. a storage unit for saving data from the disk unit 13 or the upper system 11, and a SCSI controller 124, i.e. a device adapter performing an access to the disk unit 13 and a control thereof. The CKD formatted disk is a format used on a main frame.

Figure 6:
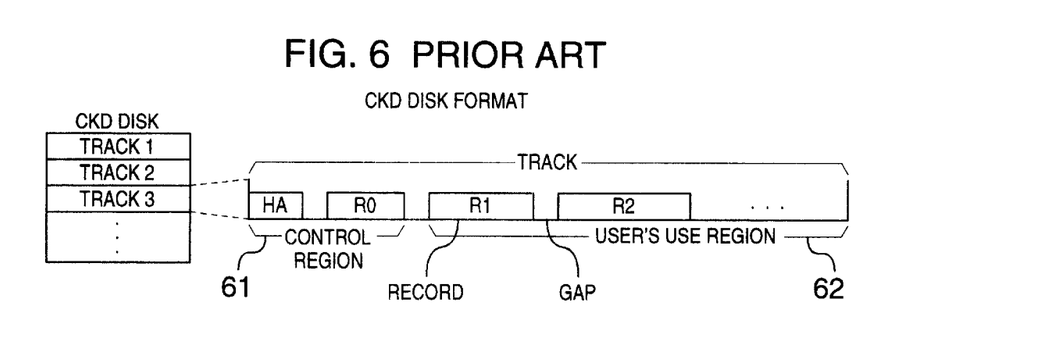
FIG. 6 is a diagram explaining a storage format within a CKD disk emulated in the present embodiment.

FIG. 6 illustrates a disk format of the CKD disk, i.e. the variable-length formatted disk in the conventional technique.

In the CKD disk, each of the tracks is equivalent to a storage capacity for one rotation of the disk, and the internal region of each track is used by being separated into variable-length records.

At the head of a track, there exist a home address (HA) and a track describing record (RO), i.e. a control region 61 that stores control information of the track.

Subsequent to the control region 61, there exists a user's use region 62. In this region, records defined by a user are separated by gaps and stored in the order of R1, R2, R3, and so on. Each of the records is a variable-length record. Moreover, within the track, the regions are defined by a format write.

Figure 7:
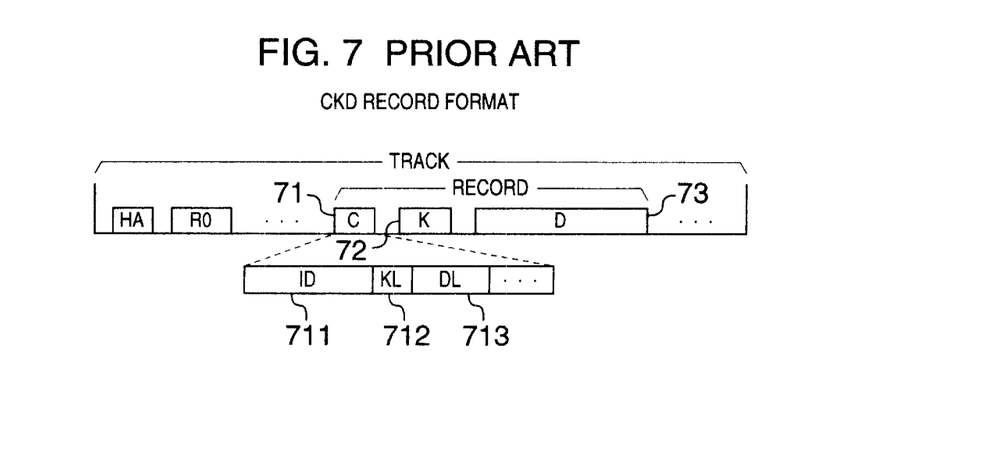
FIG. 7 is a diagram explaining a data structure within a record of the CKD disk emulated in the present embodiment.

FIG. 7 illustrates an internal data format of each record in the CKD disk.

Each record includes a count area (C area) 71 that has format information of the record, a key area (K area) 72 that stores search information of data, and a data area (D area) 73 that stores the data. The count area (C area) 71 has ID 711, i.e. an identifier establishing a search condition for the record, key length 712, and data length 713.

Among them, the count area 71 is a fixed-length area, and the key area 72 and the data area 73 are variable-length areas. Lengths of the key area 72 and the data area 73 are stored in the count area 71 as format information.

In contrast to the case of the CKD disk, the internal region of the disk unit 13 is configured by blocks that are fixed-length data regions.

Regions that are usable for the user within the disk unit are all separated into the blocks. An access to the data is executed in a unit of the block and is indicated by number of a heading block and the number of the blocks to be accessed.

In order to store the CKD formatted records, a plurality of the fixed-length blocks are assigned to each of the records.

Figure 2:
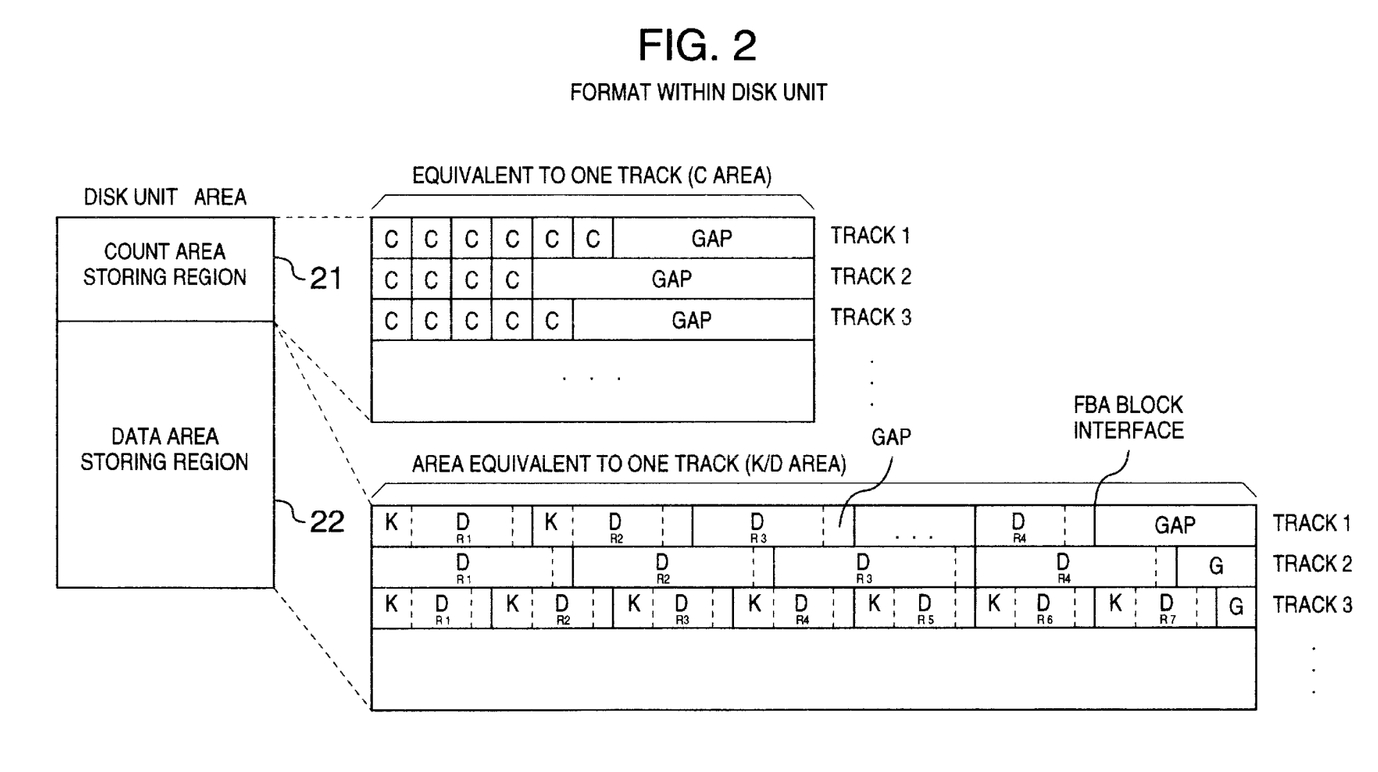
FIG. 2 is a diagram explaining a storage format within a disk unit used in the present embodiment.

FIG. 2 illustrates a format within the fixed-length disk at the time when, in the disk system according to the present embodiment, the CKD disk is emulated using the fixed-length disk.

Within the disk unit 13, the count areas in the CKD records are stored in such a manner that they are separated from the other areas (K areas, D areas). This transaction makes it possible to read out, on the cache memory, only the count areas having the format information.

The count areas thus separated are collected for each of the tracks, then being stored into a plurality of blocks within a count area storing region 21 in the order of the tracks.

The number of the blocks that are assigned in order to store the count areas in each track is set to be equivalent to an amount of storage capacity that makes it possible to store count areas included in the maximum number of the records storable in one track.

The areas other than the count areas, i.e. the key areas and the data areas, are stored for each track into a data area storing region 22 in the disk unit 13. As is the case with the count areas, the key areas and the data areas are similarly stored by, from a heading block in the order of the tracks, assigning the number of the blocks needed to emulate one track.

In each track within the data area storing region 22, a head of each record is aligned with an interface between the blocks in the order of the records. From there, the key areas and the data areas are aligned together and, then stored.

To each record, the number of the blocks needed to store the record are assigned. Moreover, an empty region extending from an end of the data area to an end of the block is used as a gap. In this way, each record is stored in a state of being aligned with the fixed-length block interface.

Figure 3:
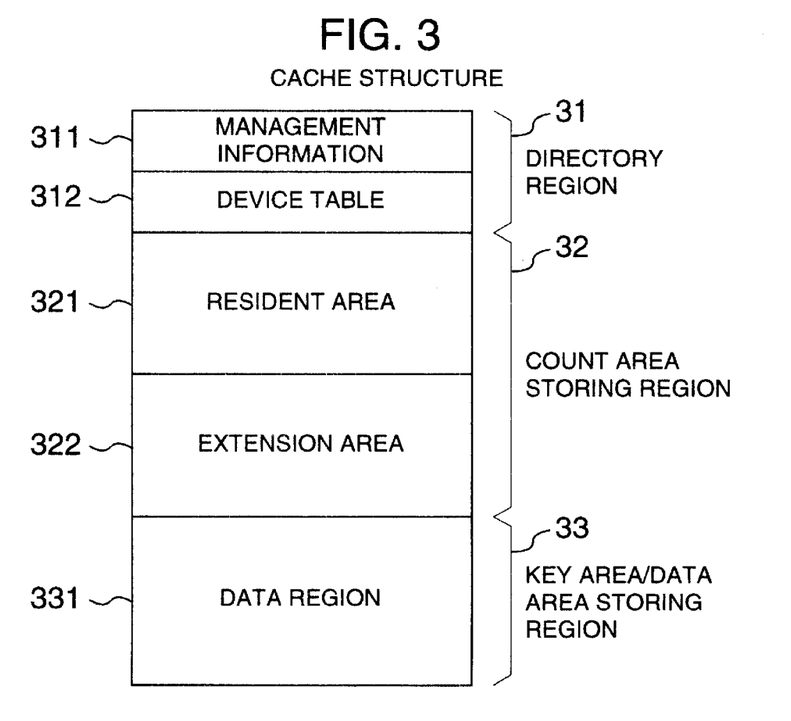
FIG. 3 is a diagram explaining a format within a cache memory used in a disk control unit in the present embodiment.

Next, the description will be given below concerning an internal structure of the cache 123.

FIG. 3 is an explanatory diagram illustrating the internal structure of the cache.

The cache 123 includes a directory area 31 that holds an address of a table to each device to be emulated, a count area storing region 32 that stores count area information, and a key area/data area storing region 33 that stores the key areas and the data areas.

Also, by assigning regions onto the cache permanently, the count area storing region 32 is configured so that it includes a resident area 321 that always holds the count areas and an extension area 322 that, when required, reads out the count areas from the disk unit so as to hold them.

Figure 4:
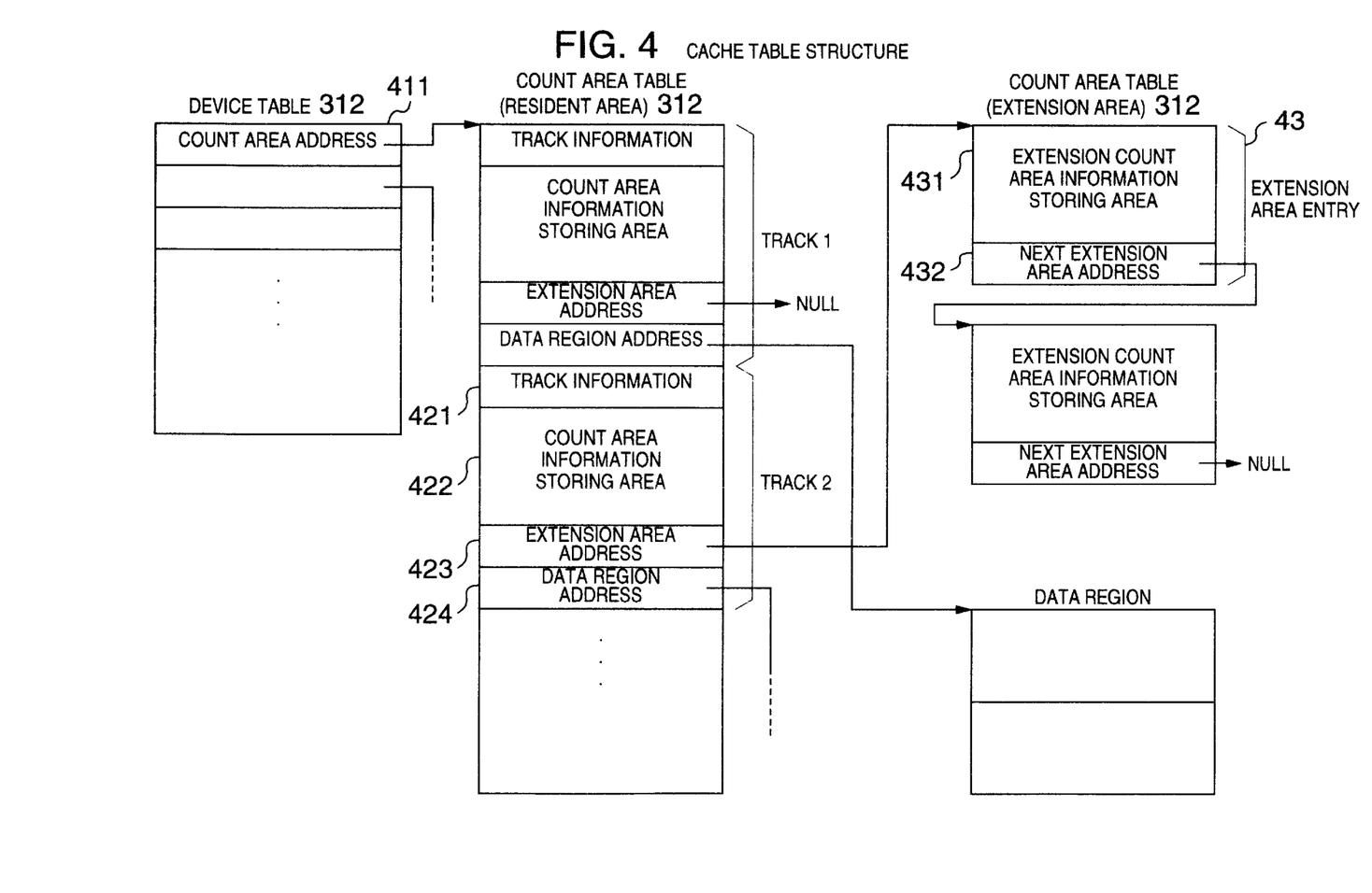
FIG. 4 is a diagram explaining a logical structure of a cache table used in the disk control unit in the present embodiment.

FIG. 4 illustrates a table structure of the count area storing region 32.

The resident area 321 in the count area storing region 32 has a region for each device. Within the region, entries each of which corresponds to an amount of each track are stored in the order of the tracks.

A head address of the region is held in a device table 312 in the directory region 31.

The entry to each track in the resident area 321 includes track information 421 that represents a state of the corresponding track, a count area information storing area 422 that, out of records within the track, stores data in count areas corresponding to the resident area, an extension area address 423 that, when the extension area 322 toward the track is assigned, holds an address toward an entry 43 of the extension area, and a data region address 424 that, when key areas/data areas in the track are assigned to a data area 331 in the cache, holds the address thereof.

The number of the records assigned to each track differs, depending on the format of the records.

For this reason, if all the regions to the count areas are assigned in a fixed manner, regions that are equivalent to the maximum number of the records definable in each track must be ensured.

The case where the number of the records becomes its maximum, however, is a case where the data length becomes shortest. Meanwhile, in order to ensure data, the data is usually lengthened to some extent. Accordingly, it is usually impossible to define the maximum number of the records.

Thus, only regions that store the count areas the number of which is usually required are ensured as the resident area. Moreover, toward a track including a large number of the records, the regions in the extension area are assigned further, thereby storing count areas in the records that are not allowed to be stored into the resident area.

The extension area 322 is used by separating the entire region thereof into the extension area entries 43 each of which has a constant size.

A state of each of the entries is managed using management information 311 stored in the directory region 31.

Each of the extension area entries 43 includes an extension count area information storing area 431 and a next extension area address 432.

When the regions in the extension area are assigned to a track, states of the extension area entries are checked using the management information 311 in the directory region 31, thereby searching for an unused entry. Then, an address of the unused entry is stored into the extension area address 423 in the resident area 321.

If the one entry within the extension area 322 thus assigned turns out to be insufficient as a region necessary for the assignment, another unused entry is further searched for. Then, an address of the another entry is stored into a next extension area address 432 included in the extension area entry 43 assigned first, thereby assigning the next extension area entry 43.

At the time of resetting, namely, at the time of starting the use of the disk unit, count areas 50 are read out from the count area storing region 21 in the disk unit 13, and are stored into the resident area 321 in the cache first.

To the track in which there exist the records that cannot completely be stored into the resident area 321, the extension area entries 43 the number of which is required therefor are assigned from the extension area 322 in the cache so as to store such records.

Figure 5:
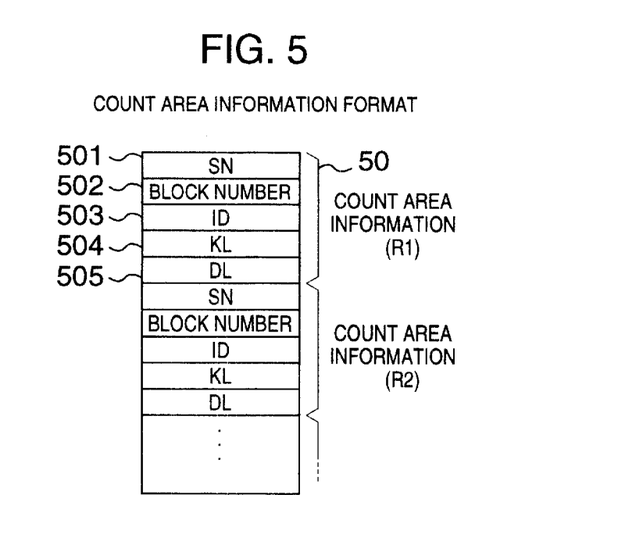
FIG. 5 is a diagram explaining a table structure of count area information stored within the cache in the disk control unit in the present embodiment.

FIG. 5 illustrates a format of the count area information 50 stored in the count area information storing area 422 and the extension count area information storing area 431 in the cache.

The count area information 50 includes SN 501 that indicates the storage position within a track in the CKD disk to be emulated, a block number 502 (that represents a place of SCSI) indicating a storage position of the record within the fixed-length disk unit 13, ID 503 for identifying the record, KL 504 indicating the key length, and DL 505 indicating the data length. These pieces of information are required when accessing the upper system.

Among them, the information other than the block number 502 are information stored in the count areas on the disk unit 13. The values read out from the disk are stored without any alterations.

Also, the block number can be determined by a calculation based on a rule that transforms the format of the CKD records to be emulated into the fixed-length format. The block number is calculated at the time of storing the format information, then being stored.

When storing the count area information 50 into the cache 123, transaction of taking the entire region of the extension area 322 as sufficiently large, in most cases, allows all the count area information to reside on the cache 123.

However, there may occur a case where, as the number of the records becomes too much large, the region of the extension area 322 runs short and turns out to be insufficient for the assignment.

In this case, in the resetting process, the extension area entries 43 are assigned until the region of the extension area runs short, thereby storing the count area information 50 included in all the tracks. Concerning tracks after the time when the region runs short, only a portion of the count area information 50 storable into the resident area 321 are stored.

When there occurs an access to a track including none of the count area information 50 in the extension area 322 on the cache 123, an unused entry within the extension area entries 43 is searched for by using the management information 311. Then, the count area information 50 are read into the unused entry from the disk unit 13.

If there exists no unused entry, an extension area entry 43 on the cache 123 is driven away out of the cache 123 so as to ensure a region, then reading the count area information 50 into the region.

In this way, the count area information 50 are permitted to be held on the cache 123.

Moreover, the use of the count area information 50 makes it possible to minimize an amount of the access to the disk unit 13 at the time of the processing to the disk system.

Figure 8:
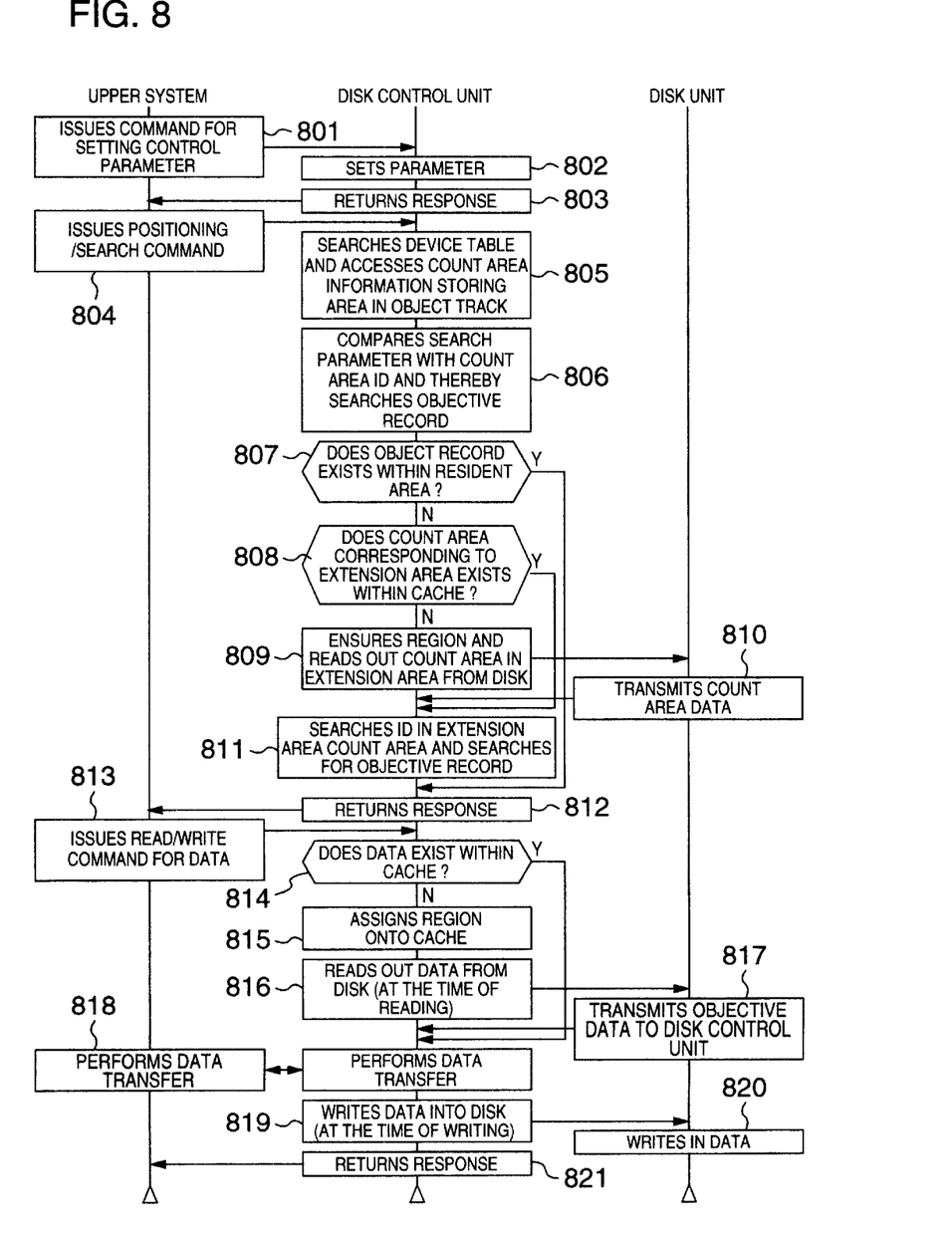
FIG. 8 is a flow chart showing processes in the case of performing a read/write operation to an objective record in the present embodiment.

Next, the explanation will be given below concerning an example of processing in the case of performing an access to a record in the disk system in the present embodiment.

The disk system performs the processing in such a manner that it receives a command from the upper system 11, and executes a processing in accordance therewith, then returning the response to the upper system 11.

First, before accessing the record, the upper system 11 issues a command for setting a controlling parameter to the disk control unit 12 (step 801).

On reception of it, the disk control unit 12 performs the setting of the parameter (step 802), then returning a response informing the termination (step 803).

Next, the upper system 11 issues a command for locating and searching to the record to be accessed (step 804).

At this time, the disk control unit 12 searches the device table 312 on the cache 123 and accesses the count area information storing area 422 toward a track thus positioned (step 805).

Then, the disk control unit 12 compares a search parameter received from the upper system 11 with ID 503 within the count area information 50, thereby searching the objective record (step 806).

If the object record has not been found within the count area information storing area 422 in the resident area 321 and in addition, if there exist records not storable into the resident area 321 (step 807), the disk control unit 12 performs a search into the extension area 322.

If there exists none of the count area information 50 to the extension area 322 on the cache 123 (step 808), the disk control unit 12, after assigning a region to the extension area 322, issues a command to the disk unit 13 so as to read out data in the count areas (step 809).

Moreover, after the disk unit 13 transmits the data in the count areas (step 810), the disk control unit 12 searches ID 503 in the extension count area information storing area 431, thereby searching for the objective record (step 811).

After finding out the record, the disk control unit 12 returns the response to the upper system 11 (step 812).

Next, the upper system 11 issues a command for performing a reading or a writing to the data areas 33 (step 813).

In the case of a reading. the disk control unit 12, at this instant, searches the data region 331 on the cache (step 814). If there exists no data, the disk control unit 12 assigns a region for data storage onto the cache (step 815), then reading out the key areas/data areas from the disk unit 13 (step 816).

At this time, from the block number 502, KL 504 and DL 505 in the count area information 50, it is possible to obtain positions and the number of blocks to be accessed. This condition makes it possible for the disk control unit 12 to read out only the object record.

Furthermore, after the object data is transmitted from the disk unit 13 (step 817), the disk control unit 12 performs transfer of the data to the upper system 11 (step 818).

After the transfer is terminated, the disk control unit 12 returns a response informing the termination to the upper system 11 (step 821).

In the case of a writing the disk control unit 12 performs a cache hit judgement to the data region 331 (step 814). If the judgement result turns out to be a cache miss, the disk control unit 12, similarly, assigns a region onto the cache (step 815).

In addition, the disk control unit 12 performs the data transfer to the upper system 11, then writing the data into the region assigned on the cache (step 818).

After that, the disk control unit 12 issues an instruction of writing the data to the disk unit 13 (step 819) and writes the data written in the cache into the disk unit 13 (step 820).

After the writing is terminated, the disk control unit 12 returns a response informing the termination to the upper system 11 (step 821).

In this way, when accessing the disk unit 13, the use of the count area information 50 makes it possible to execute the search processing without accessing the disk unit 13 by the time the reading/writing is actually executed to the data areas in the records.

Also, when accessing the disk unit 13, it is also possible to recognize positions of blocks to be accessed and the number thereof in advance on the cache. This allows only the object portion to be accessed without performing extra accesses, thus making it possible to execute a high-speed disk access.

Also, at the time of the format write, the count areas in the records have also been rewritten. In this case, only the count area information on the cache are rewritten. Meanwhile, the writing into the disk are collectively performed into the disk unit at the time when a power supply is cut off from the main frame. This transaction makes it possible to execute a high-speed processing even in the case of the format write.

According to the present invention, when a variable-length disk is emulated using a fixed-length disk, it becomes possible to read out only the format information in advance by storing the format information and the data areas in a such a manner that they are separated from each other.

According to the present invention, when emulating the variable-length formatted disk, it becomes possible to perform a search operation for an object record without accessing the disk. This makes it unnecessary to perform extra disk accesses at the time of executing a reading/writing.

According to the present invention, when storing the format information into the cache in the disk control unit, even if it is impossible to ensure a capacity large enough for storing the format information within the entire disk, it becomes possible to allow the count areas to reside on the cache by reducing a portion that is usually considered to be unnecessary.

According to the present invention, when performing a cache management of the format information, it becomes possible to enhance a cache hit rate of the format information by ensuring, as the resident area, a portion that is usually considered to be necessary.

I claim:

1. A disk system, comprising:

a disk control unit connected to an upper system that uses a variable-length formatted disk and emulating said variable-length formatted disk with the use of a fixed-length formatted disk, said variable-length formatted disk employing as an access unit a variable-length record that includes a format information area and a data area, said fixed-length formatted disk employing a constant-sized block as an access unit, and a fixed-length formatted disk unit controlled by said disk control unit, wherein said fixed-length formatted disk unit includes a format information area storing region that stores format information areas of plural records, and a data area storing region that stores data areas of plural records, and wherein said disk control unit includes means for dividing each variable-length formatted record into a format information area and a data area, and means responsive to said dividing means for independently storing said divided format information area into said format information area storing region in said disk unit and said divided data area into said data area storing region in said disk unit.

2. The disk system as claimed in claim 1, wherein said disk control unit includes a cache memory and means for reading said format information area from said format information area storing region and storing said format information area into said cache memory at the time of a reset processing of said disk system, and means responsive to execution of an access from said upper system to said disk unit, for referencing said format information area in the cache memory so as to search a specified record, thereby allowing an access to said disk unit to b e executed to said specified record .

3. The disk system as claimed in claim 1, wherein said format information area includes an identifier becoming a search condition for said record, a block number indicating a storage position within said disk unit, and data length information indicating size of said data area.

4. The disk system as claimed in claim 1, wherein said disk is a CKD disk in which each track includes a plurality of records, each of said records including a count area storing format information of s aid each record, a key area storing search information of data, and a data area.

5. The disk system a s claimed in claim 1, wherein said storing means divides said format information areas, which exist in said variable-length formatted records, from all of said records and stores all of said separated format information areas into said format information area storing region in said disk unit.

6. The disk system as claimed in claim 1, wherein said fixed-length formatted disk in said disk unit includes said format information area storing region that, collectively in a unit of track, stores said format information areas existing in said variable-length formatted records, and a data area storing region storing data and search information of said data that exist in records separated from said format information area storing region.

7. A method of controlling a disk in a disk system that includes a disk control unit connected to an upper system that uses a variable-length formatted disk and emulating said variable-length formatted disk with the use of a fixed-length formatted disk and including a cache, said variable-length formatted disk employing as an access unit a variable-length record that includes a format information area and a data area, said fixed-length formatted disk employing a block as an access unit, and a fixed-length formatted disk unit controlled by said disk control unit, comprising the steps of:

setting a format information area storing region and a data area storing region in said fixed-length formatted disk unit, said format information area storing region collectively storing said format information areas of each variable-length record, said data area storing region being separated from said format information area storing region and storing remaining data that remain in each variable-length record other than said format information area;

in said disk control unit, in response to a writing access into said variable-length record from said upper system, dividing from said variable-length record, said format information area existing in each variable-length record, and collectively storing said divided format information areas into said format information area storing region in said disk unit.

8. The method as claimed in claim 7, wherein a portion of the information stored in said format information area storing region and said data area storing region are copied into said cache memory.

9. A storage medium that stores a computer-readable program for carrying out the method as claimed in claim 7 with the use of a computer.

\* \* \* \* \*